United States Patent
Lee et al.

(10) Patent No.: US 10,772,107 B2
(45) Date of Patent: Sep. 8, 2020

(54) V2X OPERATION METHOD PERFORMED BY TERMINAL IN WIRELESS COMMUNICATION SYSTEM AND TERMINAL USING SAME METHOD

(71) Applicant: LG ELECTRONICS INC., Seoul (KR)

(72) Inventors: Seungmin Lee, Seoul (KR); Hanbyul Seo, Seoul (KR); Myoungseob Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/753,166

(22) PCT Filed: Aug. 19, 2016

(86) PCT No.: PCT/KR2016/009215
§ 371 (c)(1),
(2) Date: Feb. 15, 2018

(87) PCT Pub. No.: WO2017/030423
PCT Pub. Date: Feb. 23, 2017

(65) Prior Publication Data
US 2018/0255558 A1    Sep. 6, 2018

Related U.S. Application Data

(60) Provisional application No. 62/206,905, filed on Aug. 19, 2015.

(51) Int. Cl.
*H04W 72/10* (2009.01)
*H04L 12/911* (2013.01)
(Continued)

(52) U.S. Cl.
CPC .......... *H04W 72/10* (2013.01); *H04W 76/14* (2018.02); *H04L 47/821* (2013.01); *H04W 4/40* (2018.02); *H04W 72/0493* (2013.01)

(58) Field of Classification Search
CPC ....... H04W 72/10; H04W 4/40; H04W 76/14; H04L 47/821
See application file for complete search history.

(56) References Cited

U.S. PATENT DOCUMENTS 9,525,556 B2 * 12/2016 Park .................. H04L 67/12
2011/0238987 A1 * 9/2011 Kherani ............. H04L 1/0041
713/168

(Continued)

OTHER PUBLICATIONS

PCT International Application No. PCT/KR2016/009215, Written Opinion of the International Searching Authority dated Nov. 14, 2016, 4 pages.

(Continued)

*Primary Examiner* — Rasheed Gidado
(74) *Attorney, Agent, or Firm* — Lee Hong Degerman Kang Waimey

(57) ABSTRACT

The present invention provides a vehicle-to-x (V2X) operating method performed by a terminal in a wireless communication system, the method comprising: being allocated a (dedicated) resource pool used for transmission of a V2X message having a relatively high priority, wherein the (dedicated) resource pool includes a plurality of resource areas; and transmitting the V2X message having the high priority on the basis of the (dedicated) resource pool.

7 Claims, 21 Drawing Sheets

(51) Int. Cl.
*H04W 76/14* (2018.01)
*H04W 4/40* (2018.01)
*H04W 72/04* (2009.01)

(56) References Cited

U.S. PATENT DOCUMENTS

| | | | |
|---|---|---|---|
| 2013/0083679 A1 | 4/2013 | Krishnaswamy et al. | |
| 2013/0163523 A1* | 6/2013 | Hughes | H04B 1/713 370/329 |
| 2013/0279491 A1* | 10/2013 | Rubin | G08G 1/166 370/347 |
| 2014/0143834 A1* | 5/2014 | Stahlin | H04L 67/12 726/3 |
| 2016/0219029 A1* | 7/2016 | Oshida | H04L 67/1095 |
| 2016/0242223 A1* | 8/2016 | Brahmi | H04W 28/021 |
| 2016/0338078 A1* | 11/2016 | Wang et al. | H04W 72/10 |
| 2017/0006594 A1* | 1/2017 | Wei | H04W 72/1242 |
| 2017/0230939 A1* | 8/2017 | Rudolf | H04L 12/1863 |
| 2017/0325214 A1* | 11/2017 | Lu | H04W 76/14 |
| 2018/0070264 A1* | 3/2018 | Saiwai | H04W 28/0278 |
| 2018/0132238 A1* | 5/2018 | Hu | H04L 5/0044 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.
Samsung, "Priority handling for D2D communication," 3GPP TSG-RAN WG1 #82, R1-154134, Aug. 2015, 5 pages.
InterDigital Communications, "Support of different priorities for D2D communication," 3GPP TSG-RAN WG1 #82, R1-154730, Aug. 2015, 7 pages.
Huawei, "Clarification on the MNO entity used for authorization," 3GPP TSG-SA WG1 #71, S1-152171, Aug. 2015, 5 pages.

* cited by examiner

V2X OPERATION METHOD PERFORMED BY TERMINAL IN WIRELESS COMMUNICATION SYSTEM AND TERMINAL USING SAME METHOD

CROSS-REFERENCE TO RELATED APPLICATIONS

This application is the National Stage filing under 35 U.S.C. 371 of International Application No. PCT/KR2016/009215, filed on Aug. 19, 2016, which claims the benefit of U.S. Provisional Application No. 62/206,905, filed on Aug. 19, 2015, the contents of which are all hereby incorporated by reference herein in its entirety.

BACKGROUND OF THE INVENTION

Field of the Invention

The present invention relates to wireless communication, and more particularly, to a V2X operation method performed by a user device in a wireless communication system and the user device performing the method.

Related Art

In the International Telecommunication Union Radio Communication sector (ITU-R), standardization of International Mobile Telecommunication (IMT)-Advanced, which is a next generation mobile communication system after 3rd generation, is underway. IMT-Advanced aims to support IP (Internet Protocol) based multimedia service at a data transfer rate of 1 Gbps in a stationary and low-speed moving state, and at a data transfer rate of 100 Mbps in a high-speed moving state.

The 3rd Generation Partnership Project (3GPP) is preparing, as a system standard meeting the requirements of IMT-Advanced, the LTE-Advanced (LTE-A), an improved version of LTE (Long Term Evolution), based on OFDMA (Orthogonal Frequency Division Multiple Access)/SC-FDMA (Single Carrier-Frequency Division Multiple Access) transmission scheme. LTE-A is one of the strong candidates for IMT-Advanced.

Recently, there has been a growing interest in D2D (Device-to-Device) technology in which direct communication is performed between devices. In particular, D2D is attracting attention as a communication technology for public safety networks. Commercial communications networks are rapidly changing to LTE. However, the current public safety network is mainly based on 2G technology, in terms of conflicts with existing communication standards and cost. This technological gap and the need for improved services have led to efforts to improve the public safety network.

Compared to commercial communication networks, public safety networks have high service requirements (reliability and security). In particular, even when the coverage of cellular communication is not available, the public safety network requires direct signaling, or D2D operation, between the devices.

The D2D operation may have various advantages in that the D2D operation refers to transmission and reception of signals between adjacent devices. For example, a D2D device can communicate data at high transmission rates and low latency. In addition, D2D operation may distribute traffic which may otherwise concentrate on the base station. If the D2D device acts as a relay device, the D2D device can also extend the coverage of the base station.

The extension of D2D communication described above includes signal transmission and reception between vehicles. The communication associated with the vehicle is specifically referred to as V2X (VEHICLE-TO-X) communication. A D2D (or V2X) message transmitted by the user device may include a relatively high priority D2D (or V2X) message and a relatively low priority D2D (or V2X) message. In this connection, the D2D (or V2X) message having a relatively high priority means a (SECURITY) message having a relatively large payload size. Alternatively, the D2D (or V2X) message having a relatively high priority may mean a message transmitted /received in a relatively long period.

Some or all of (time/frequency) transmission resource positions associated with a D2D (or V2X) message with a relatively high priority collide between different user devices. Thus, it is difficult to reliably (or receive) a corresponding D2D (or V2X) message (having a relatively high priority). In this case, the instability of D2D (or, V2X) communication may be further increased.

Accordingly, the present invention intends to provide a method for efficiently transmitting and receiving a D2D (or V2X) message having a relatively high priority in order to solve the above problems.

SUMMARY OF THE INVENTION

The present invention provides a V2X operation method performed by a user equipment in a wireless communication system, and a user equipment performing the method.

In an aspect, a method for vehicle-to-X (V2X) operation in a wireless communication system is provided. The method may be performed by a user equipment (UE) and comprise applying allocation of a dedicated resource pool configured to be used to transmit a V2X message having a high priority, wherein the dedicated resource pool includes a plurality of resource regions, and transmitting the V2X message having a high priority using the dedicated resource pool.

The dedicated resource pool may be one resource pool designated based on a pre-configured offset value among a plurality of resource pools assigned to the user device.

Applying allocation of the dedicated resource pool configured to be used to transmit the V2X message having a high priority may includes applying allocation of a plurality of transmission resource pool, selecting candidates for the dedicated resource pool used for the transmission of the V2X message having a high priority among the plurality of transmission resource pools, wherein the candidates for the dedicated resource pool includes a first resource pool and a second resource pool, and determining one of the first resource pool and the second resource pool as the dedicated resource pool used for the transmission of the V2X message having a high priority.

The dedicated resource pool may be one of a second resource pool designated based on a pre-configured first offset value, and a second resource pool designated based on a pre-configured second offset value, among a plurality of resource pools allocated to the user device.

The V2X message having the high priority may be transmitted using a randomly selected resource among the first resource pool.

The dedicated resource pool may include a relatively larger amount of transmission resources than a resource pool used to transmit a V2X message having a relatively lower priority than the higher priority.

The method may further comprise, determining, by the user device, among the plurality of resource regions on the dedicated resource pool, a resource region on which a V2X message having a high priority transmitted by another user equipment is detected at a relatively smaller degree. Transmitting the V2X message having the high priority may include transmitting the V2X message having the high priority using the detected resource region.

The method may further comprise, configuring, by the user device, the plurality of resource regions in the dedicated resource pool such that the V2X message having the high priority is transmitted on a first resource region that is different from a second resource region, wherein the second region is used to transmit a high-priority V2X message by another user device. Transmitting the V2X message having the high priority may include transmitting the V2X message having the high priority using the first resource region.

The V2X message having the high priority may be a V2X message having a relatively long period.

The V2X message having the higher priority may be a V2X message having a relatively large payload size.

The V2X message having the high priority may be a V2X message about certificate.

In another aspect, a user equipment (UE) is provided. The UE may comprise a radio frequency (RF) unit configured for transmitting and receiving a radio signal, and a processor coupled to the RF unit. The processor may be configured to apply allocation of a dedicated resource pool configured to be used to transmit a V2X message having a high priority, wherein the dedicated resource pool includes a plurality of resource regions, and transmit the V2X message having a high priority using the dedicated resource pool.

In accordance with the present invention, there is provided a D2D operation method performed by a user equipment in a wireless communication system, and there is provided a user equipment performing the method.

In accordance with the present invention, there is provided a V2X operation method performed by a user equipment in a wireless communication system, and there is provided a user equipment performing the method. According to the present invention, some or all of the (time/frequency) transmission resource locations associated with the D2D (or V2X) message with a relatively high priority are prevented from colliding between different user devices. This ensures stable delivery (or reception) of the corresponding D2D (or V2X) message (having a relatively high priority). This increases the stability of D2D communication.

DESCRIPTION OF EXEMPLARY EMBODIMENTS

Figure 1:
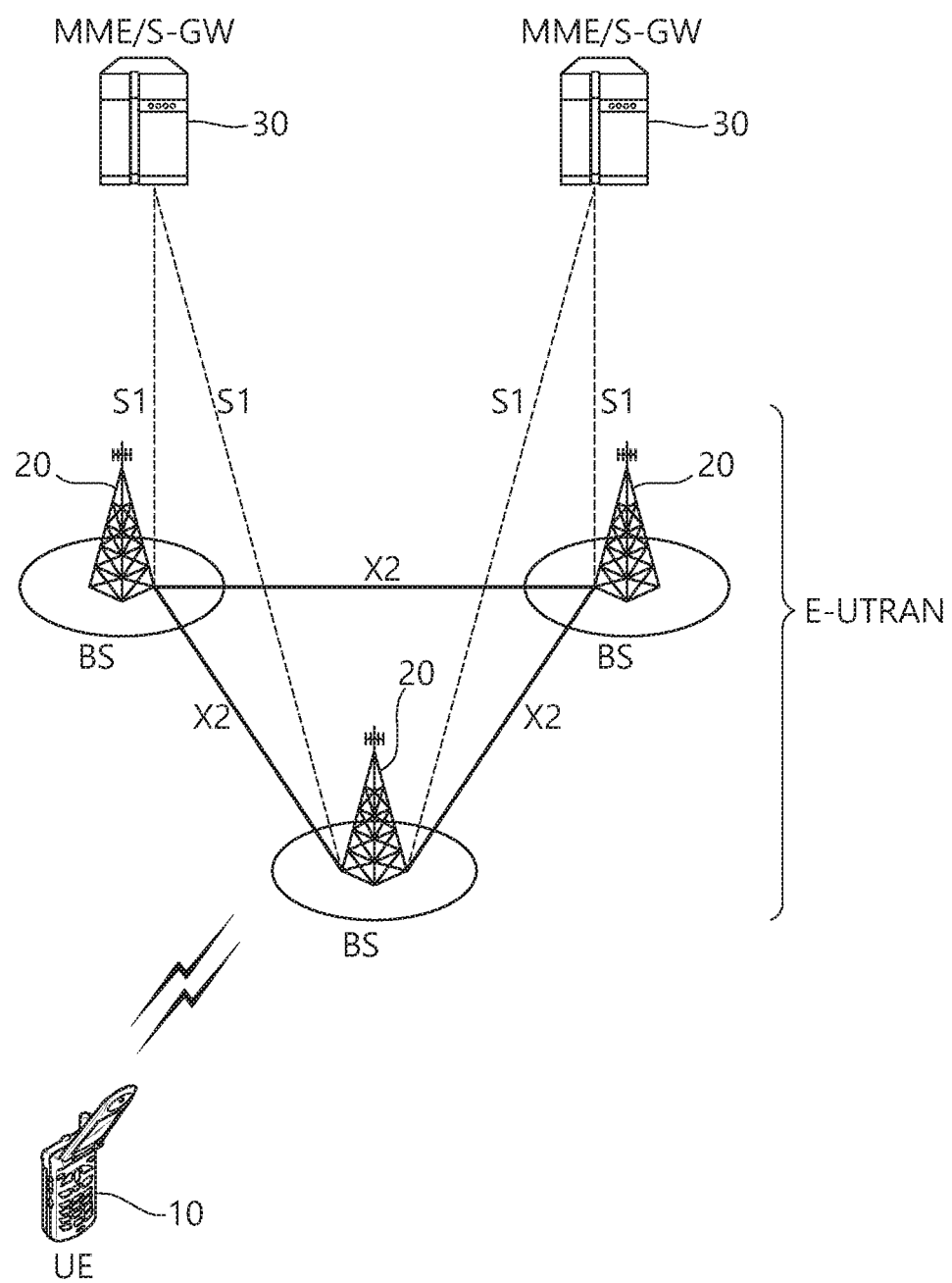
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
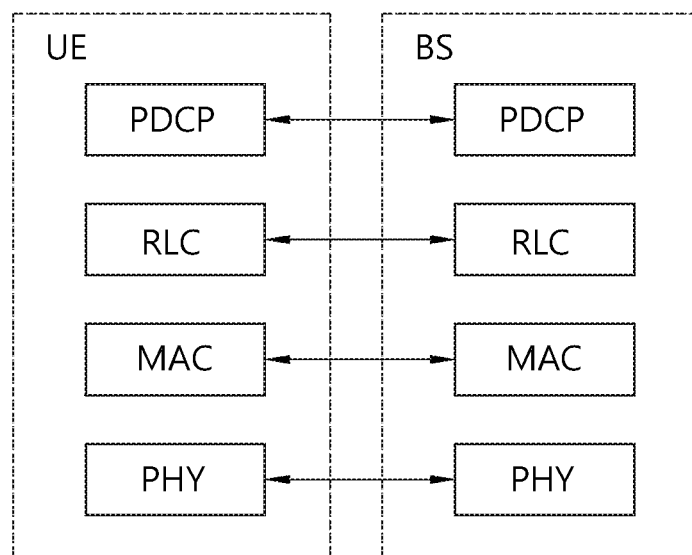
FIG. 2 is a diagram showing a wireless protocol architecture for a user plane.
Figure 3:
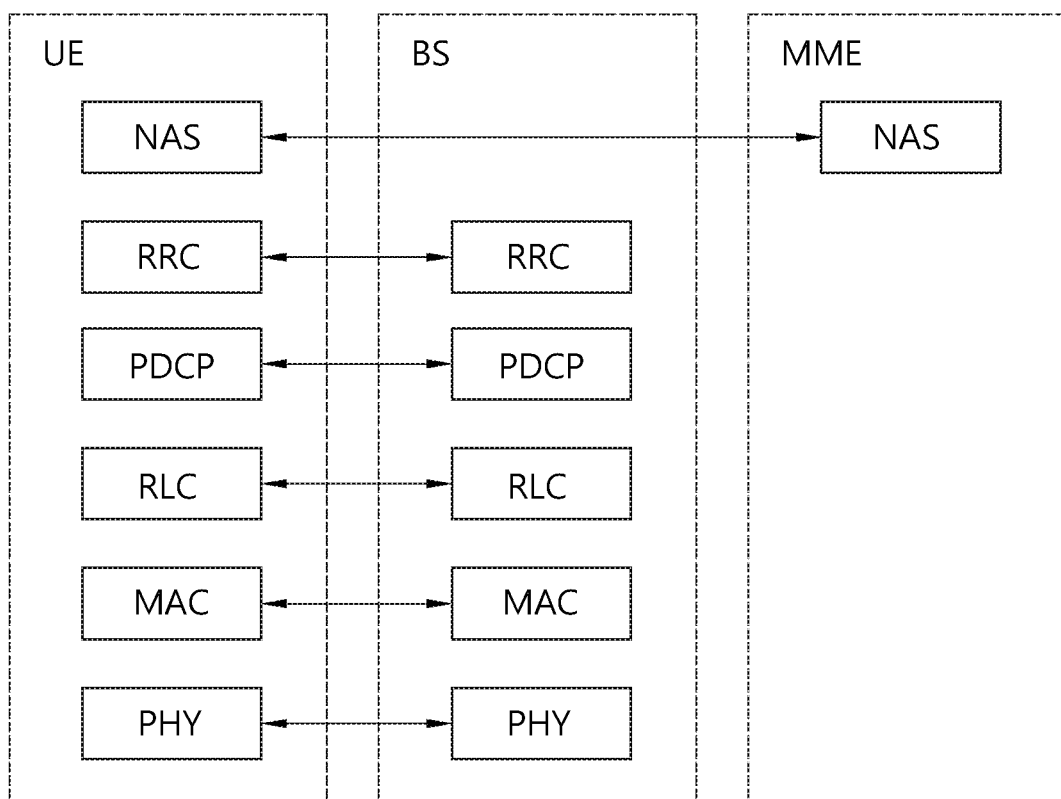
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators.

This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
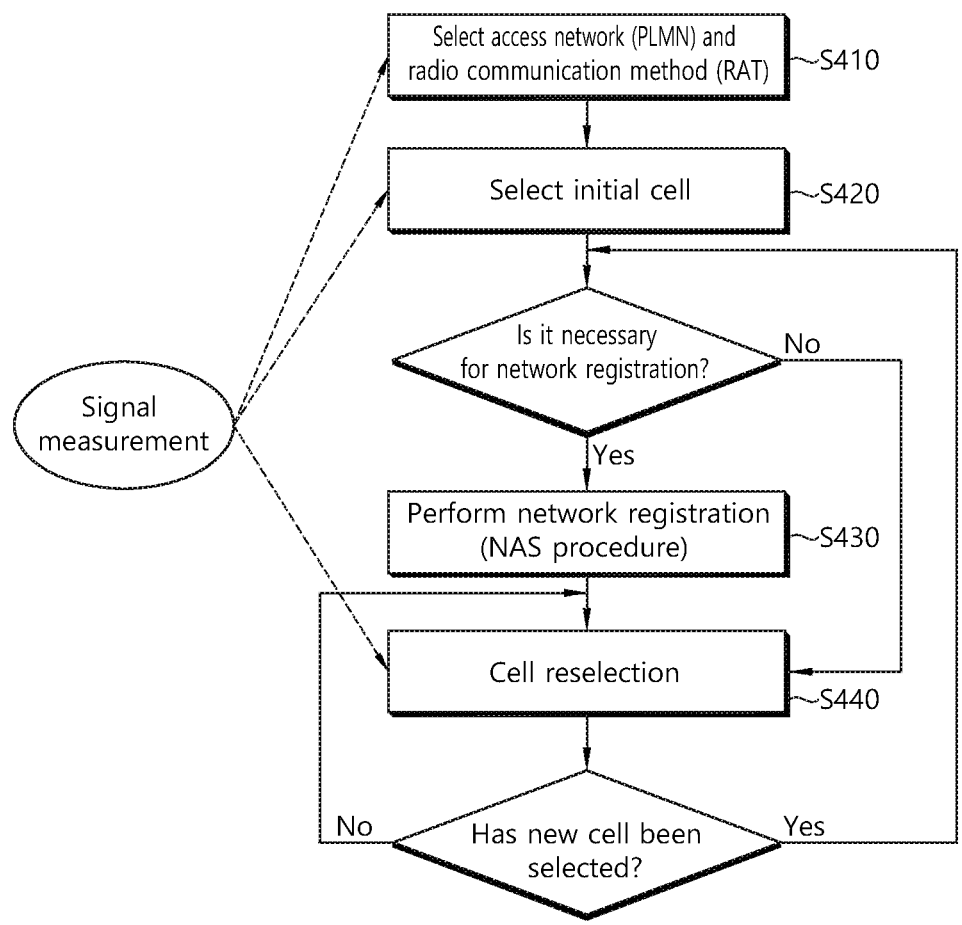
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
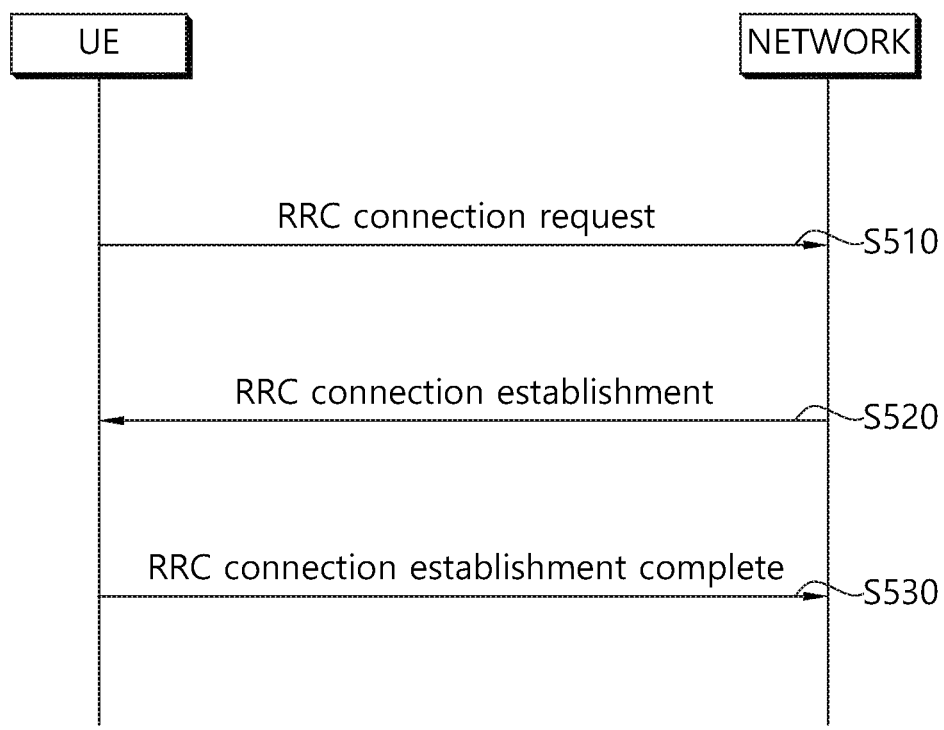
FIG. 5 is a flowchart illustrating a procedure of establishing RRC connection.

FIG. 5 is a flowchart illustrating a procedure of establishing RRC connection. UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
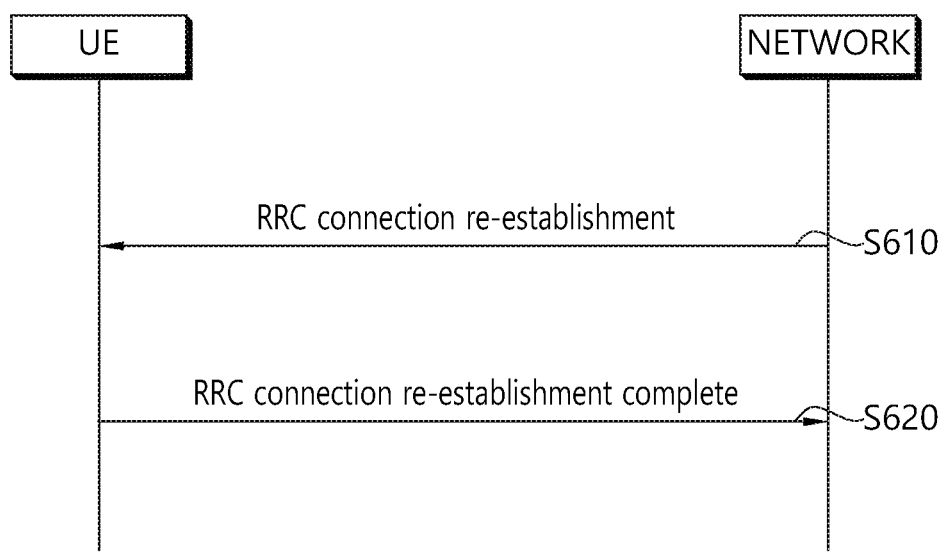
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$Srxlev>0$ AND $Squal>0$.

where:

$Srxlev=Q_{rxlevmeas}-(Q_{rxlevmin}+Q_{rxlevminoffset})-P_{compensation}$, $Squal=Q_{qualmeas}-(Q_{qualmin}+Q_{qualminoffset})$ [Equation 1]

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 7:
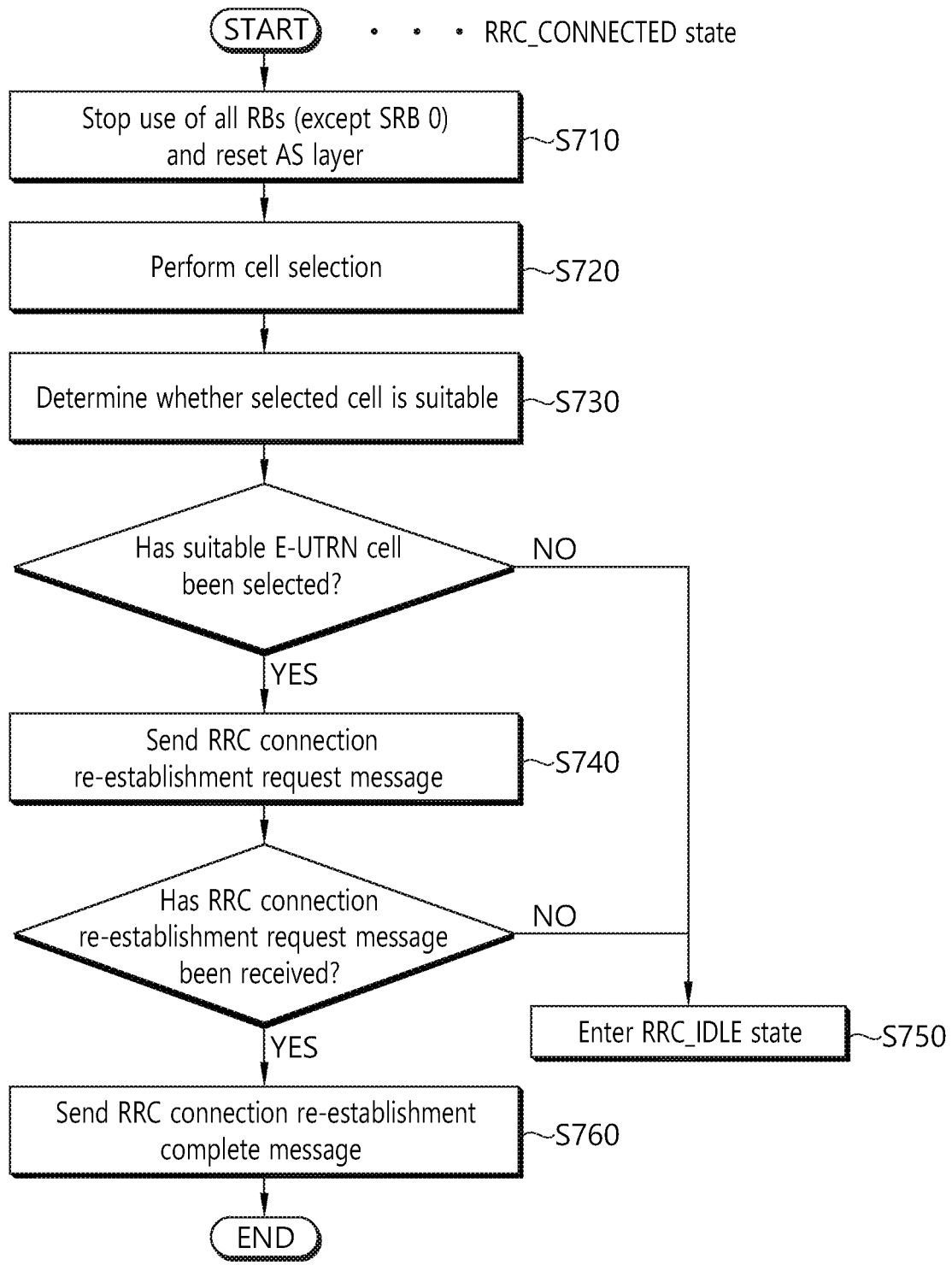
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
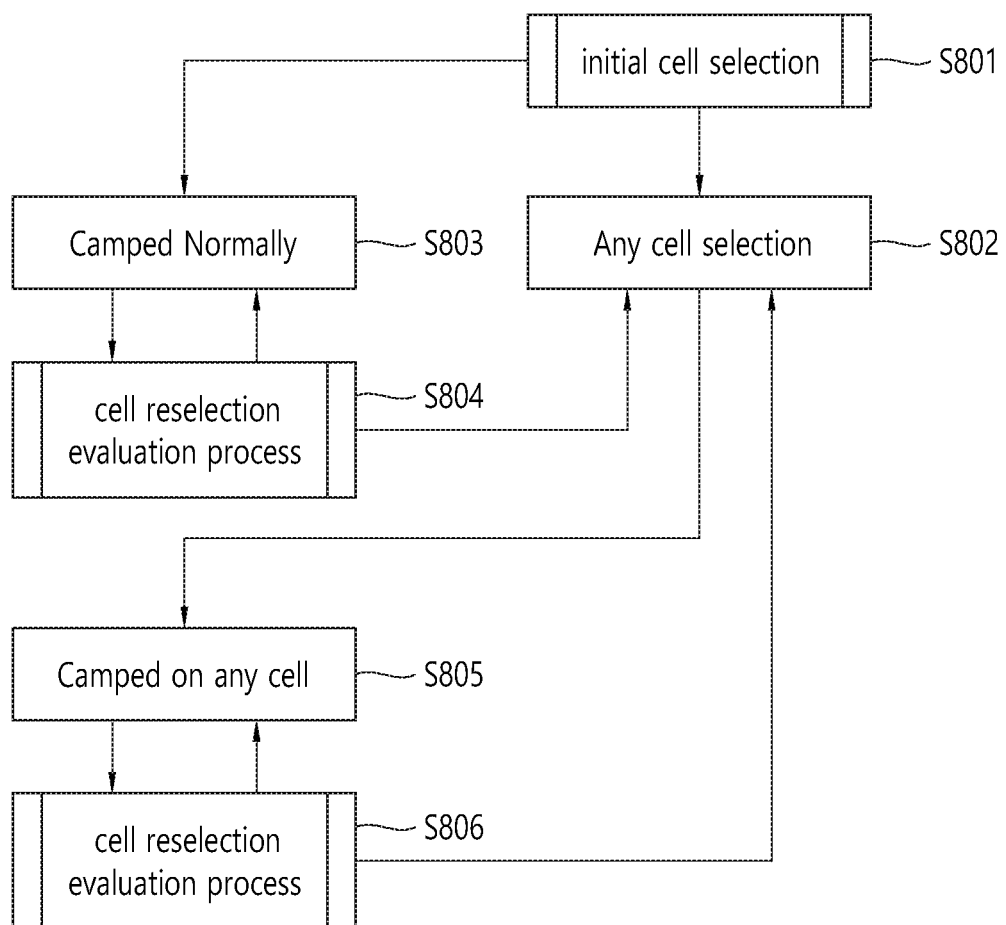
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
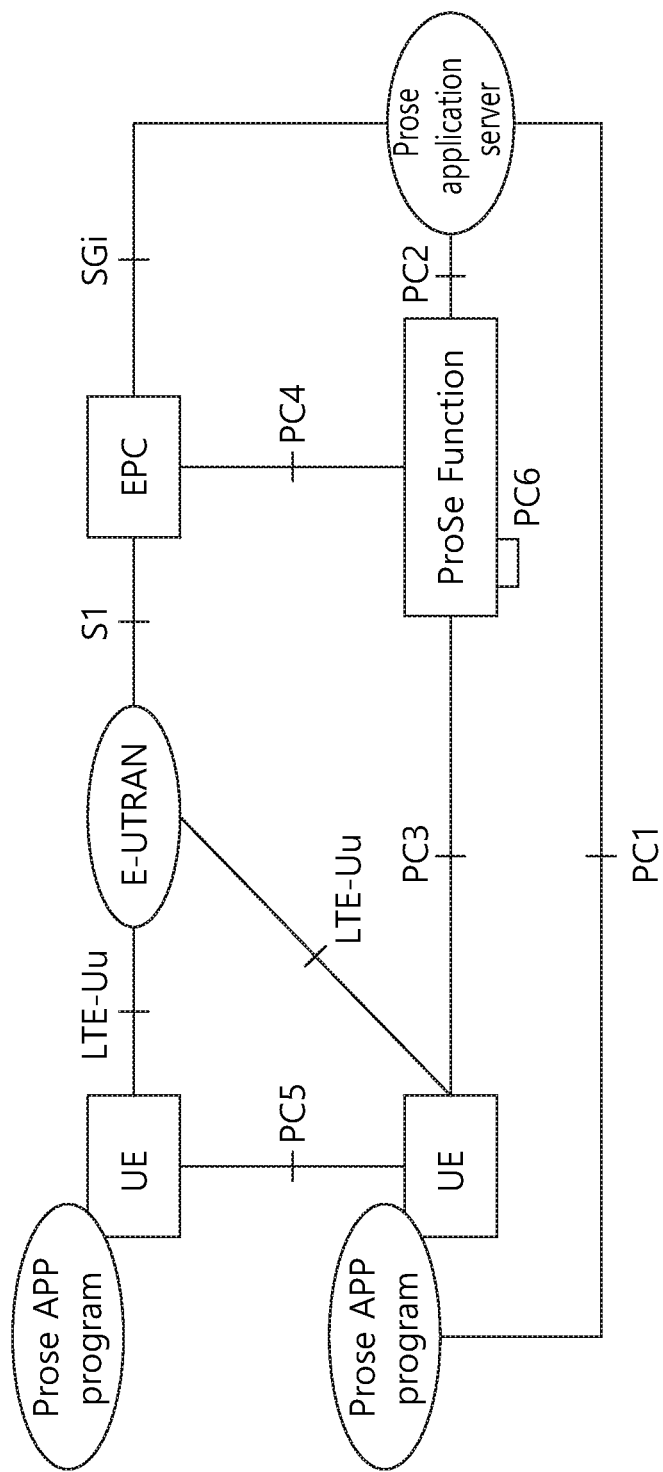
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
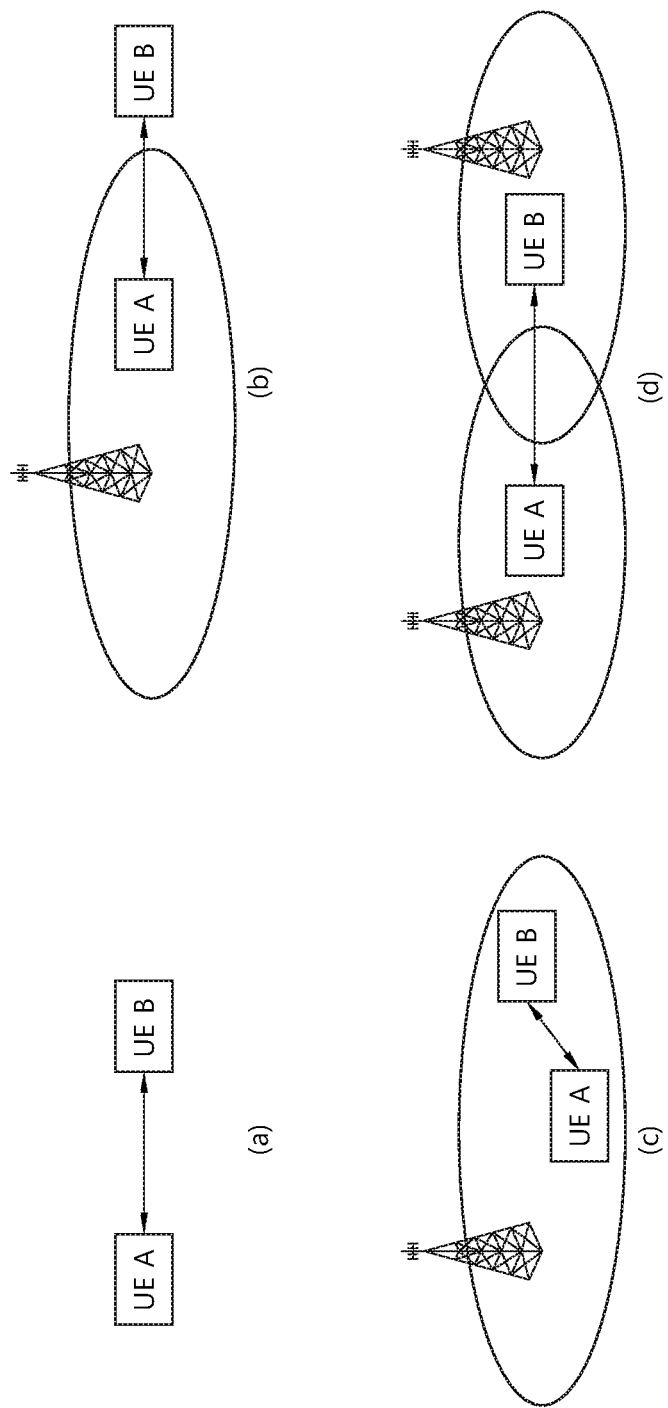
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
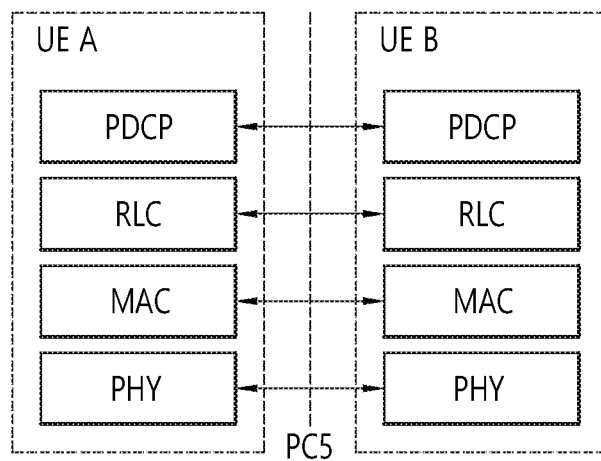
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for Prose Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
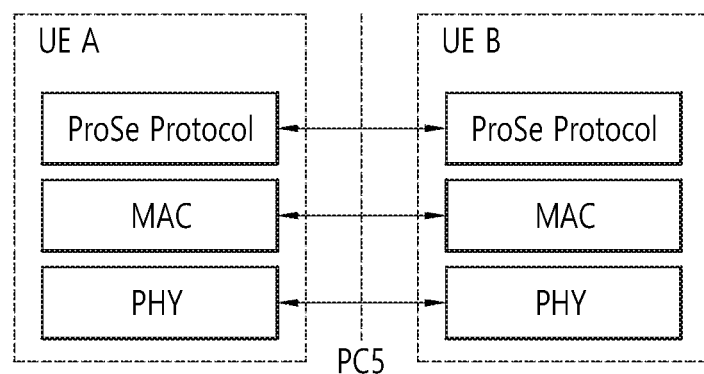
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

The present invention will be described below.

In one example, generally, the D2D operation may have various advantages in that the D2D operation refers to transmission and reception of signals between adjacent devices. For example, a D2D device can communicate data at high transmission rates and low latency. In addition, D2D operation may distribute traffic which may otherwise concentrate on the base station. If the D2D device acts as a relay device, the D2D device can also extend the coverage of the base station.

The extension of D2D communication described above includes signal transmission and reception between vehicles. The communication associated with the vehicle is specifically referred to as V2X (VEHICLE-TO-X) communication. In this connection, in one example, V2X (VEHICLE-TO-X), 'X' may refer to PEDESTRIAN (COMMUNICATION BETWEEN A VEHICLE AND A DEVICE CARRIED BY AN INDIVIDUAL (for example, HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (for example, RSU IS A TRANSPORTATION INFRASTRUCTURE ENTITY (for example, AN ENTITY TRANSMITTING SPEED NOTIFICATIONS) IMPLEMENTED IN AN eNB OR A STATIONARY UE)) (V2I/N). In one example, for convenience of explanation of the proposed method, a device (related to V2P communication) owned by a pedestrian (or person) is named "P-UE". A device (related to V2X communication) installed in VEHICLE is called "V-UE". Further, in one example, in the present invention, the term 'ENTITY' may be interpreted as P-UE and/or V-UE and/or RSU (/NETWORK/INFRASTRUCTURE).

A D2D (or V2X) message transmitted by the user device may include a relatively high priority D2D (or V2X) message and a relatively low priority D2D (or V2X) message. In this connection, the D2D (or V2X) message having a relatively high priority means a (SECURITY) message having a relatively large payload size. Alternatively, the D2D (or V2X) message having a relatively high priority may mean a message transmitted /received in a relatively long period.

Some or all of (time/frequency) transmission resource positions associated with a D2D (or V2X) message with a relatively high priority collide between different user devices. Thus, it is difficult to reliably (or receive) a corresponding D2D (or V2X) message (having a relatively high priority). In this case, the instability of D2D (or, V2X) communication may be further increased.

Accordingly, the present invention intends to provide a method for efficiently transmitting and receiving a D2D (or V2X) message having a relatively high priority in order to solve the above problems. That is, the schemes proposed below provides a method for efficiently transmitting/receiving a V2X message with a relatively high priority as predefined (or signaled) (and/or a V2X message with a relatively large payload size, and/or a V2X message transmitted/received in a relatively long period) (collectively named as "HP_V2XMSG").

Hereinafter, for the convenience of explanation, the present invention will be described mainly from the viewpoint of the V2X device. However, the present invention is not limited to this. Explaining the present invention from the perspective of the V2X device is merely for convenience of explanation. The V2X device may be replaced with a D2D device, as described below. That is, the following embodiments may also apply to D2D devices. In the following, a method for transmitting and receiving a V2X message having a high priority and/or a low priority and a resource pool configuration for the above method are mainly described. The present invention is not limited to this. This is only for the convenience of explanation of the present invention. As will be described below, the V2X message may be replaced with a D2D message. That is, the following embodiments may also apply to D2D messages.

In one example, the HP_V2XMSG may be specified as some of the following V2X (SECURITY) messages.

1) In the case of SAE, 'CERTIFICATE message' sent/received with relatively long period (2 HZ) and/or large payload size (130 BYTES).

Example) IN SAE/ETSI, THE SECURITY OVERHEAD IS BASICALLY COMPOSED OF CERTIFICATE AND SIGNATURE.

Example) EACH BSM IS TRANSMITTED WITH A SIGNATURE AND EITHER A SECURITY CERTIFICATE CONTAINING THE PUBLIC KEY OR A DIGEST (HASH OF THE CURRENT SECURITY CERTIFICATE). THE CERTIFICATE IS TRANSMITTED PERIODICALLY, AND OTHER BSM(S) ARE TRANSMITTED WITH A DIGEST TO REDUCE THE OVERALL MESSAGE LENGTH. THE RECEIVER MUST BUFFER RECENTLY RECEIVED CERTIFICATES AND BE ABLE TO IDENTIFY THE CERTIFICATE CORRESPONDING TO A RECEIVED DIGEST Example) THE SYSTEM SHALL ATTACH A CERTIFICATE TO A BSM WHEN THE TIME INTERVAL BETWEEN THE CURRENT BSM AND THE GENERATION OF A PREVIOUS BSM WITH AN ATTACHED CERTIFICATE (NOT CERTIFICATE DIGEST) IS GREATER THAN OR EQUAL TO vMaxCertDigestInterval(=450 ms)

Example)

TABLE 2

| TYPE | LENGTH (BYTES) | FREQUENCY |
| --- | --- | --- |
| SIGNATURE | 56 | 10 HZ |
| CERTIFICATE DIGEST | 8 | 10 HZ (EXCEPT FOR MESSAGE W/CERTIFICATE) |
| CERTIFICATE | 130 | 2 HZ |

2) Example) In the case of ETSI, 'CAM LF COMPONENT' and/or 'CERTIFICATE message' sent/received in relatively long period (2 HZ) and/or with a large payload size (130 BYTES).

Example) DENM MESSAGE IS NOT CONSIDERED AS EVENT-TRIGGERED MESSAGES ARE MUCH FEWER.

Example) CAM TRANSMISSION FREQUENCY IS DETERMINED BY VEHICLE YAW RATE, SPEED AND ACCELERATION.

Example) 10 HZ TRANSMISSION FREQUENCY IS CONSIDERED TO COVER THE HIGHEST FREQUENCY.

Example) CAM PACKET SIZE IS DIVIDED INTO HIGH FREQUENCY (HF) WITH 10 HZ AND LOW FREQUENCY (LF) WITH 2 HZ.

Example) SAME PATH HISTORY GENERATION MECHANISM AS SAE

Example) CERTIFICATE IS SENT EVERY 1 S

Example)

TABLE 3

| COMPONENT | DISTRIBUTION | PARAMETERS |
| --- | --- | --- |
| CAM HF COMPONENT TRANSMISSION FREQUENCY | DETERMINISTIC | 10 HZ |
| CAM LF COMPONENT TRANSMISSION FREQUENCY | DETERMINISTIC | 2 HZ |
| CAM HF COMPONENT SIZE | DETERMINISTIC | 54 BYTES |
| CAM LF COMPONENT SIZE | DETERMINISTIC | 60 BYTES |
| SIGNATURE | DETERMINISTIC | 64 BYTES |
| CERTIFICATE | DETERMINISTIC | 130 BYTES |

TABLE 3-continued

In one example, it is desirable to avoid, as much as possible, the situation that the locations of (time/frequency) resources associated with HP_V2XMSG TX(S) collides between different V2X TX ENTITY(S).

In this connection, in one specific example, HP_V2XMSG is specified as SECURITY MESSAGE. If the SECURITY MESSAGE TX(S) collides with each other between different V2X TX ENTITY(S), the V2X RX ENTITY(S) may fail to receive corresponding SECURITY MESSAGE (HP_V2XMSG) and V2X data message(s) that may be attempted to be decoded (successfully transmitted) only after a successful reception of the SECURITY MESSAGE (HP_V2XMSG).

Therefore, in one example, the methods to guarantee reliable transmission/reception of HP_V2XMSG are as follows.

Figure 13:
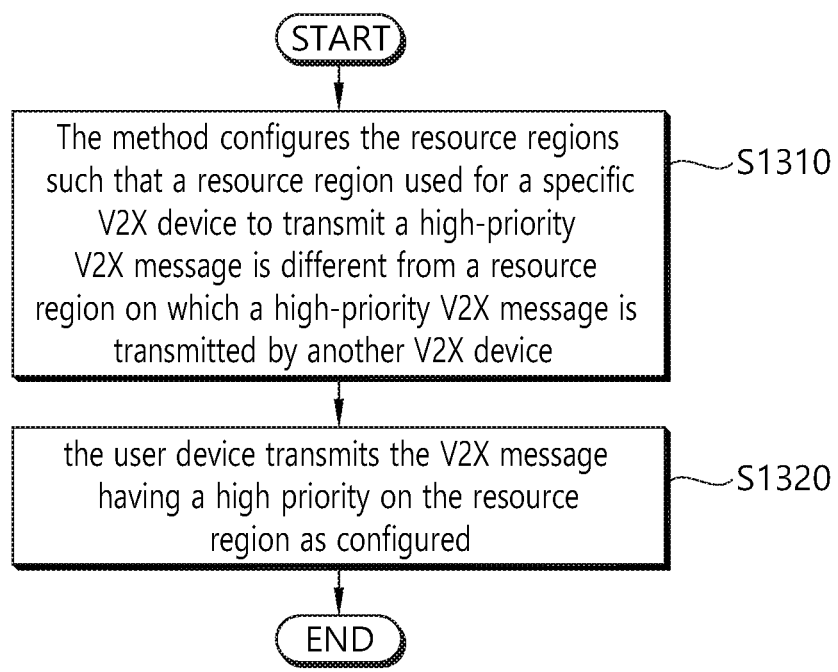
FIG. 13 is a sequence of methods for transmitting a V2X message having a high priority according to one embodiment of the present invention.

1. A method of configuring a resource region for the V2X device to transmit a high-priority V2X message on a resource region other than a resource region in which a high-priority V2X message is transmitted by another V2X device FIG. 13 is a sequence of methods for transmitting a V2X message having a high priority according to one embodiment of the present invention.

The method may configure the resource regions such that a resource region used for a specific V2X device to transmit a high-priority V2X message is different from a resource region on which a high-priority V2X message is transmitted by another V2X device (S1310). In this connection, a concrete example of the V2X message having high priority is as described above. For example, a V2X message with a high priority may mean a 'CERTIFICATE message' sent/received in a relatively long period (2 HZ) and/or with a large payload size (130 BYTES).

More specifically,

[Proposed method #1] In one example, transmission resources may be configured so that the locations of the time (/frequency) resource used to transmit HP_V2XMSG (for example, SECURITY MESSAGE) (130 BYTES, 2 HZ FREQUENCY) may not overlap (or are distributed) between V2X TX entities (or between pre-defined or signaled V2X TX ENTITY groups).

This intends to prevent as much as possible the situation that transmission of a V2X message with a high priority by the (specific) user device collides with transmission of a high priority V2X message by another user device, which causes the V2X message with the higher priority transmitted by the (specific) user device to be non-received or corrupted.

In this connection, in one concrete example, a configuration may be as follows: V2X TX ENTITY # A (or V2X TX ENTITY GROUP # A) transmits HP_V2XMSG according to 'SF OFFSET=0 MILLISECOND (MS)' and 'TX PEREODICITY=500 MS', while V2X TX ENTITY # B (or V2X TX ENTITY GROUP # B) transmits HP_V2XMSG according to 'SF OFFSET=250 MS' and 'TX PEREODICITY=500 MS'.

That is, in one example, the application of this method can mitigate the HP_V2XMSG TX COLLISION(S) between different V2X TX ENTITY(S) (or V2X TX ENTITY GROUP (S)). In another example, it may be configured such that the 'SF OFFSET' value associated with HP_V2XMSG transmission may hop (or vary) in 'PSEUDO RANDOM' manner. In this connection, an example of the corresponding hopping (or varying) pattern may be configured differently depending on the input parameter such as V2X TX ENTITY ID (or V2X TX ENTITY GROUP ID or (CONNECTION or ASSOCIATED) CELL(/RSU) ID or HP_V2XMSG RESOURCE POOL ID). In this connection, the application of this method may mitigate the situation that when VEHICLE(S) (or V-UE(S)) that happen to be adjacent to each other (or moving side by side at a similar speed) may select the same (or similar) 'SF OFFSET' value, which results in a continuous 'HP_V2XMSG TX COLLISION'.

Thereafter, the user device may transmit the V2X message having a high priority on a resource region configured according to the above rule (S1320). A concrete example in which the user device transmits the V2X message is as described above.

2. A method of transmitting a corresponding (high priority) V2X message using a resource with relatively low energy as detected among the multiple resource regions in the resource pool configured to transmit V2X messages with a high priority FIG. 14 is a sequence of methods for transmitting a V2X message having a high priority according to another embodiment of the present invention.

Figure 14:
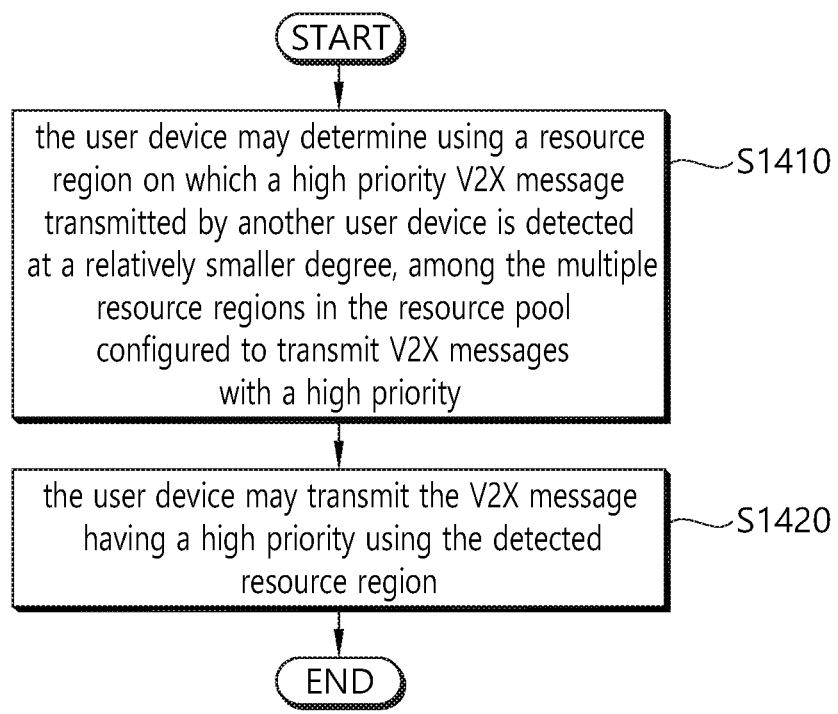
FIG. 14 is a sequence of methods for transmitting a V2X message having a high priority according to another embodiment of the present invention.

Referring to FIG. 14, the user device may determine a resource with relatively low energy as detected among the multiple resource regions in the resource pool configured to transmit V2X messages with a high priority, wherein the resource with relatively low energy as detected may refer to a resource on which a high priority V2X message transmitted by another user device is detected at a relatively smaller degree (S1410). In this connection, the concrete details of the V2X message having high priority are as described above. For example, the V2X message with high priority may mean a 'CERTIFICATE message' sent/received in a relatively long period (2 HZ) and/or with a large payload size (130 BYTES).

More specifically,

[Proposed method #2] In one example, the following configuration may be made: V2X TX ENTITY (or V2X TX ENTITY GROUP) transmitting HP_V2XMSG (for example, SECURITY MESSAGE) may preform:

(A) a blind decoding operation on HP_V2XMSG (S) transmitting by another V2X TX ENTITY(S) (in the resource region configured for HP_V2XMSG transmission), and/or, (B) energy sensing (for example, RSSI) operation (for the resource region configured for HP_V2XMSG transmission), thereafter, perform the corresponding HP_V2XMSG transmission using (time/frequency) resources used to perform HP_V2XMSG TX(S) by a relatively small number of V HP_V2XMSG TX(S) and/or a relatively low-energy detected (time/frequency) resource.

In this connection, the information (for example, the period of the resource region (/pool), the size of the resource region (/pool), the location of the resource region (/pool), etc.) about the resource region configured for the HP_V2XMSG transmission, may be received via an upper layer (for example, RRC signal).

In summary, the user device avoids the following situation through corresponding decoding/sensing: the situation that the user device transmits a V2X message having a higher priority on the resource region used to transmit a V2X message having a higher priority by another user device. Thus, a collision of transmissions of the V2X messages having a high priority between the user device and said another user device may be prevented. That is, the application of this method may mitigate HP_V2XMSG TX COLLISION(S) between different V2X TX ENTITY(S) (or V2X TX ENTITY GROUP(S)).

Thereafter, the user device may transmit the V2X message having a high priority using the detected resource (S1420). In this connection, the detailed example in which the user device transmits the V2X message is as described above.

3. A method for allocating (dedicated) resource pools used for V2X message transmissions with high priority FIG. 15 is a sequence of methods for transmitting a V2X message with a higher priority according to still another embodiment of the present invention.

Figure 15:
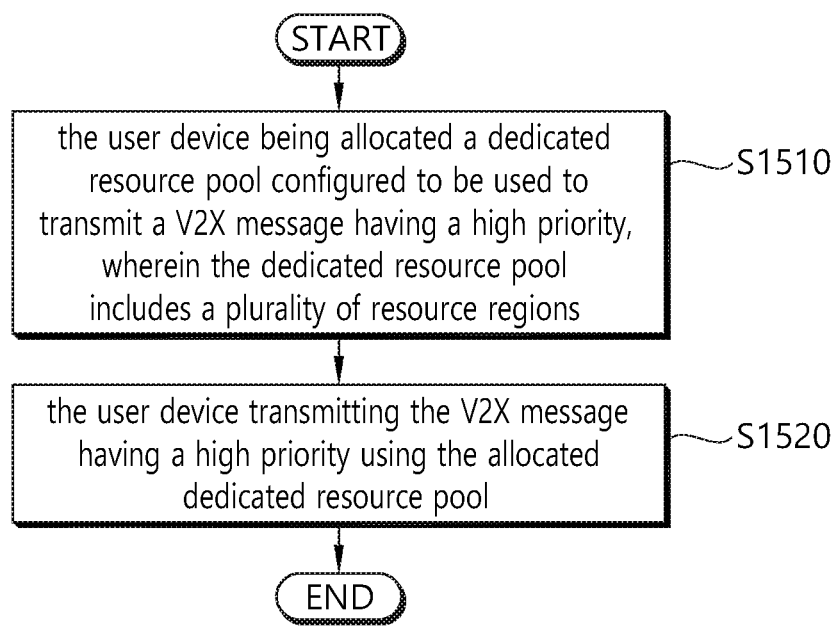
FIG. 15 is a sequence of methods for transmitting a V2X message with a higher priority according to still another embodiment of the present invention.

According to FIG. 15, the user device may be allocated a resource pool. That is, the user device may be allocated a resource pool containing multiple resource regions. In this connection, the resource pool may refer to a (dedicated) resource pool used for V2X message transmission with high priority (S1510). In other words, the user device may receive information about the (dedicated) resource pool containing multiple resource regions from the base station. Then, the device may determine a (dedicated) resource pool configured to transmit the V2X message having the high priority, based on information on the received resource pool. In this connection, the user device may receive information about the resource pool via the upper layer (for example, RRC signaling). Alternatively, the user device may receive information about the resource pool based on broadcasting. That is, the user device may acquire information on the resource pool via a system information block (SIB).

In this connection, the resource pool may include a plurality of resources (or resource regions, or resource elements) as described above. In other words, the resource pool may mean a plurality of resource regions. In this connection, the resource pool may be defined in the time-frequency region, or it may be defined in the code domain, or the spatial domain.

Hereinafter, a specific example of this method will be described.

[Proposed method #3] As described above, in one example, HP_V2XMSG (for example, SECURITY MESSAGE) may be specified as a V2X message with a relatively large payload size (and/or a V2X message with a relatively high priority and/or a V2X message sent/received in a relatively long period).

Therefore, in one example, for reliable transmission/reception of the corresponding HP_V2XMSG, "RESOURCE POOL" composed of a relatively larger amount of (time/frequency) resources may be configured for the corresponding HP_V2XMSG rather than another kind (/type) of V2X message (for example, V2X data message) (named LP_V2XMSG). That is, the size of the resource pool for transmission of V2X messages with high priority and the size of the resource pool for transmission of V2X messages with low priority may be allocated differently for the user device.

Figure 16:
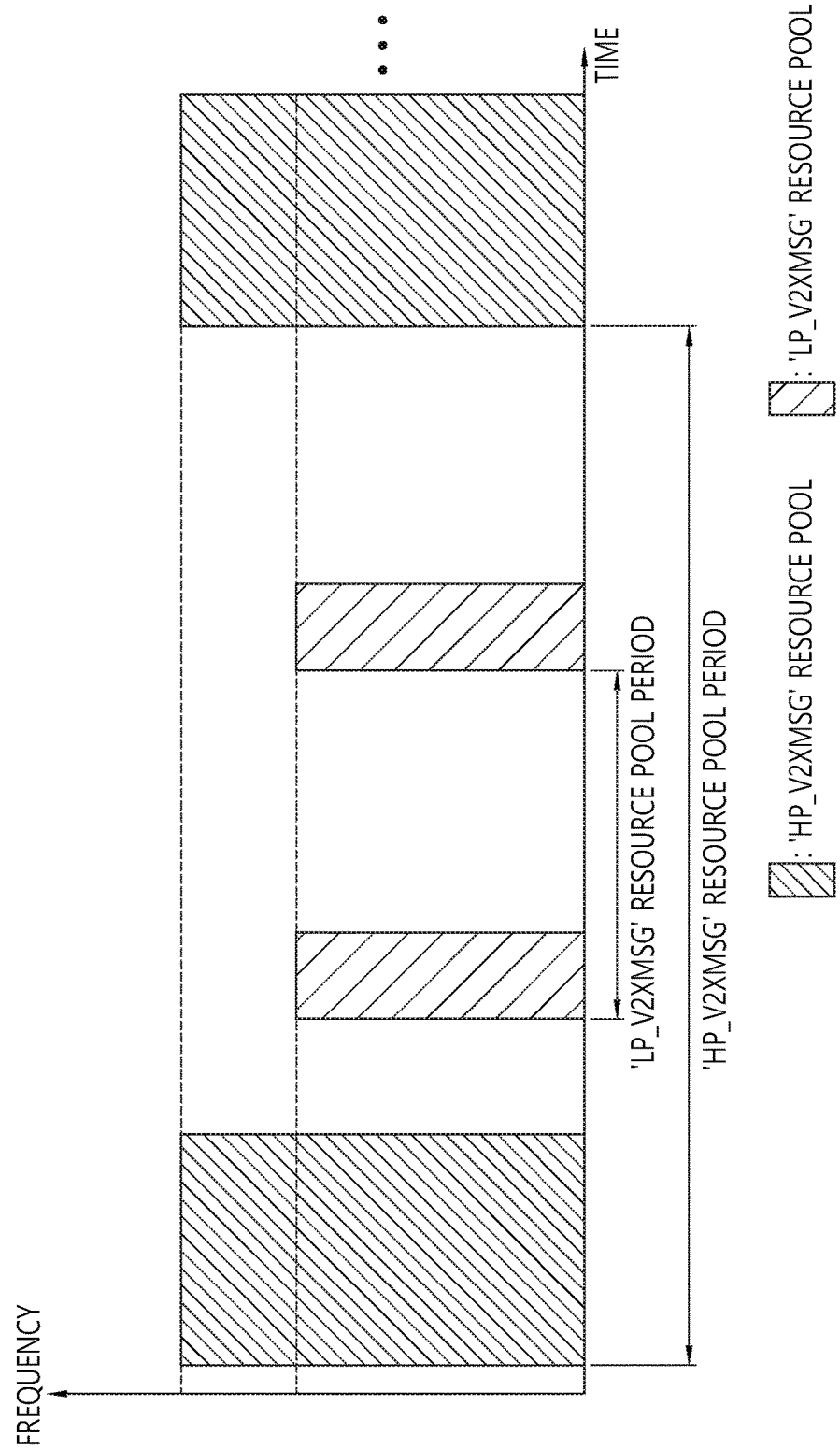
FIG. 16 shows an example of a case where resource regions of different sizes are configured for a resource pool for transmission of a message having a high priority and a resource pool for transmission of a message having a low priority.

In this connection, in one example, the corresponding LP_V2XMSG may be specified as a V2X message with a relatively lower priority (and/or a V2X message with a relatively small payload size and/or a V2X message sent/received in a relatively short period). Further, in one example, the application of this method may keep HP_V2XMSG CODING RATE high enough to achieve high reliability level. Alternatively, the application of this method may mitigate HP_V2XMSG TX COLLISION(S) between different V2X TX ENTITY (S) (or V2X TX ENTITY GROUP (S)). FIG. 16 shows an example of a case where resource regions of different sizes are configured for a resource pool for transmission of a message having a high priority and a resource pool for transmission of a message having a low priority.

[Proposed method #4] In one example, in order to minimize the amount of battery consumption associated with receiving HP_V2XMSG (S) (for example, SECURITY MESSAGE) by P-UE(S), it may be configured such that the V2X TX ENTITY(S) (or V2X TX ENTITY GROUP (S)) preform the transmission operation(s) of HP_V2XMSG(S) on pre-defined (or signaled) common time(/frequency) resource (named "COMPOOL_HP_V2XMSG").

In this connection, in one example, when the method is applied, the P-UE(S) performs 'WAKE-UP' and 'HP_V2XMSG (S) reception operations' only on the time (/frequency) resources for the corresponding COMPOOL_HP_V2XMSG, which can reduce battery consumption.

Further, in one example, the COMPOOL_HP_V2XMSG may be defined as a 'RESOURCE POOL' composed of a relatively larger amount of time/frequency resources according to [Proposed method #3] as described above.

In this connection, in one example, the application of this method may keep HP_V2XMSG CODING RATE high enough to achieve high reliability level. Alternatively, the application of this method may mitigate HP_V2XMSG TX COLLISION(S) between different V2X TX ENTITY(S) (or V2X TX ENTITY GROUP(S)).

[Proposed method #5] In one example, under the circumstance where 'RESOURCE POOL' as pre-defined (or signaled) appears repeatedly (or periodically) according to a period (P) and if the V2X TX ENTITY needs to perform 'J·P' period based LP_V2XMSG transmission and/or 'W·P' period based HP_V2XMSG transmission, it may be configured such that the V2X TX ENTITY may select RESOURCE POOL(S) related to LP_V2XMSG transmission and/or RESOURCE POOL(S) related to HP_V2XMSG transmission according to the following (some or all of) rules.

In this connection, in one example, 'J<W' and, each of 'J' value and 'W' value may be defined as positive integers greater than or equal to zero. Further, in one example, applying the [Proposed method #5] may mitigate situation where LOAD (/CONGESTION) associated with HP_V2XMSG transmission is concentrated on a single RESOURCE POOL. Further, in one example, in the rules as proposed below, '(SF) OFFSET' value may be hopped in a 'PSEUDO RANDOM' manner according to [Proposed method #1] as described above.

(Rule #1) LP_V2XMSG transmission-related 'RESOURCE POOL' may be specified as one of the 'RESOURCE POOL(S)' as specified according to the previously set (or signaled) 'OFFSET' value among T 'RESOURCE POOL(S)'.

Figure 17:
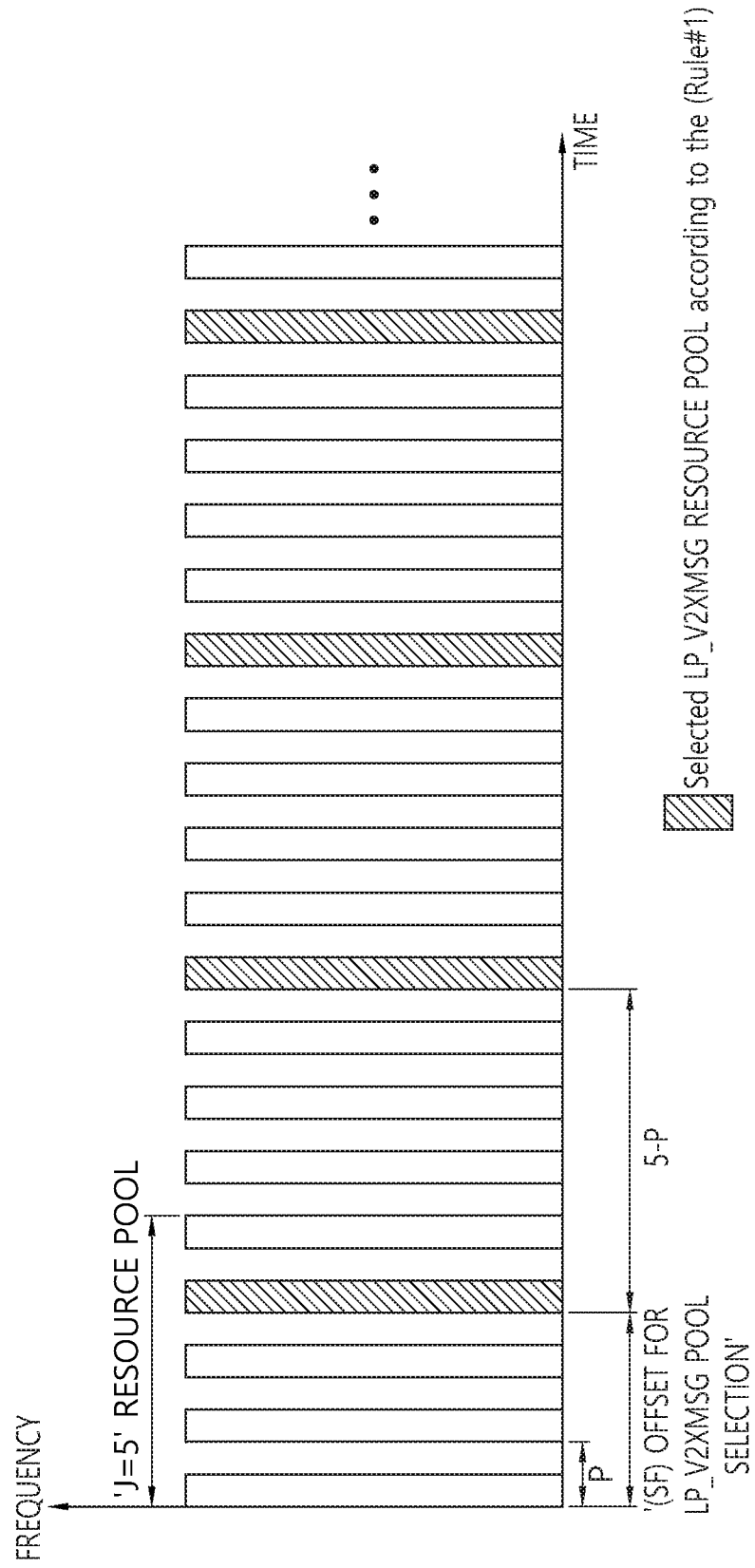
FIG. 17 shows an example in which the (Rule #1) is applied.

In this connection, in one example, the V2X TX ENTITY may (randomly) select LP_V2XMSG transmission-related 'TX RESOURCE(S)' in the corresponding selected one 'RESOURCE POOL'. FIG. 17 shows an example in which the (Rule #1) is applied. In this connection, in one example, it may be assumed that the 'J' value is configured as '5'.

In this connection, as described above, the offset value may be hopped in a 'PSEUDO RANDOM' manner.

(Rule #2) HP_V2XMSG transmission-related 'RESOURCE POOL' may be selected finally (randomly) as one of multiple (for example, 2) 'RESOURCE POOL' candidates specified based on a plurality (for example, 2) of '(SF) OFFSET' values as pre-configured (or signaled) among 'W' RESOURCE POOL(S).

Figure 18:
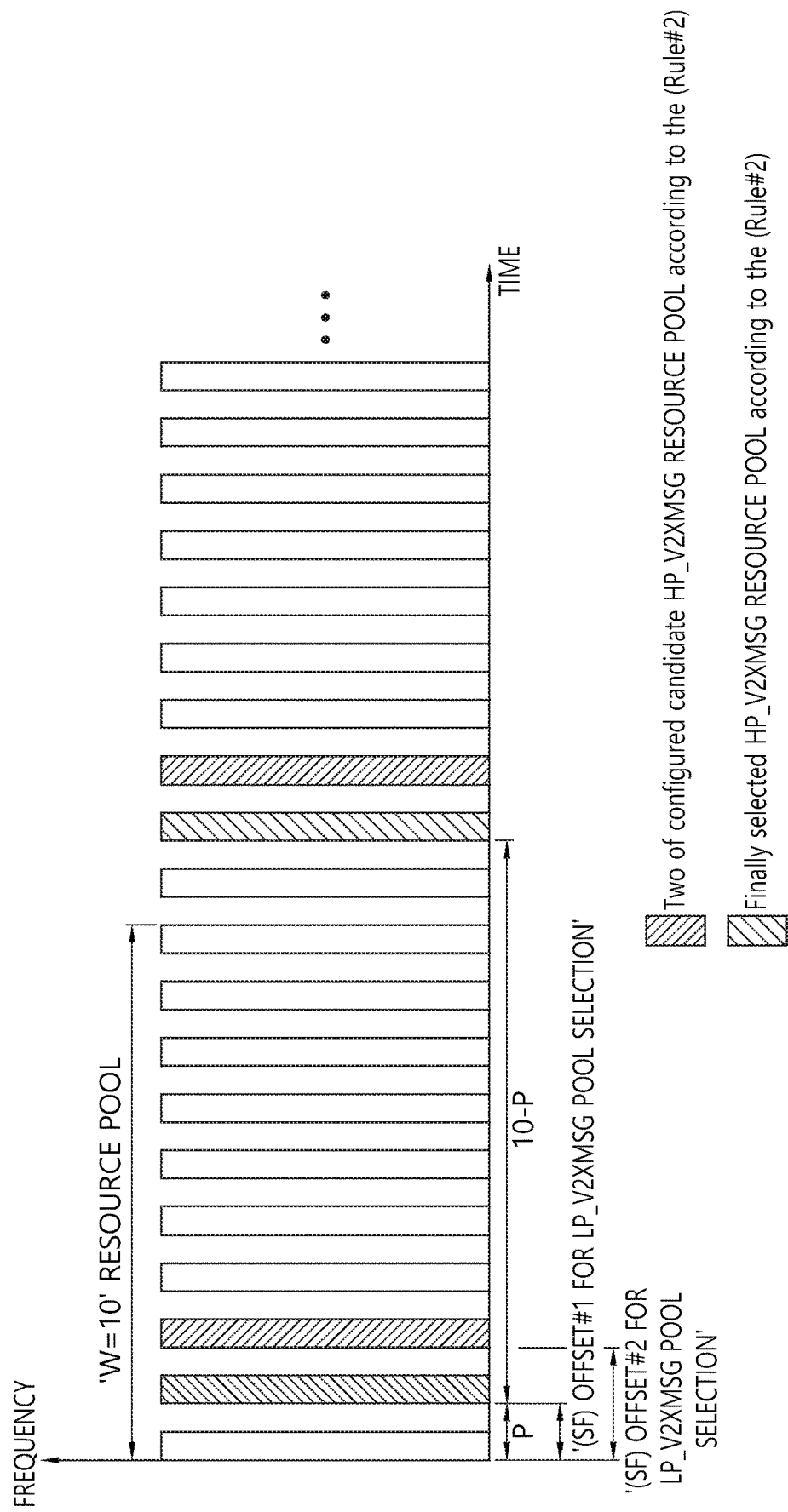
FIG. 18 shows an example in which the (Rule #2) is applied.

In this connection, in one example, the V2X TX ENTITY may (randomly) select HP_V2XMSG transmission-related 'TX RESOURCE(S)' in the corresponding selected one 'RESOURCE POOL'. FIG. 18 shows an example in which the (Rule #2) is applied. In this connection, in one example, it may be assumed that the 'W' value is configured as '10'. Further, in one example, two (SF) OFFSETs ((SF) OFFSET #1, (SF) OFFSET #2) are assumed to be configured in this example.

(Rule #3) HP_V2XMSG transmission-related 'RESOURCE POOL' may be selected as multiple (for example, 2) 'RESOURCE POOLS' specified based on a plurality (for example, 2) of '(SF) OFFSET' values as pre-configured (or signaled) among 'W' RESOURCE POOL(S).

In this connection, in one example, the V2X TX ENTITY may (randomly) select HP_V2XMSG transmission-related 'TX RESOURCE(S)' in the corresponding selected multiple 'RESOURCE POOLS'.

Figure 19:
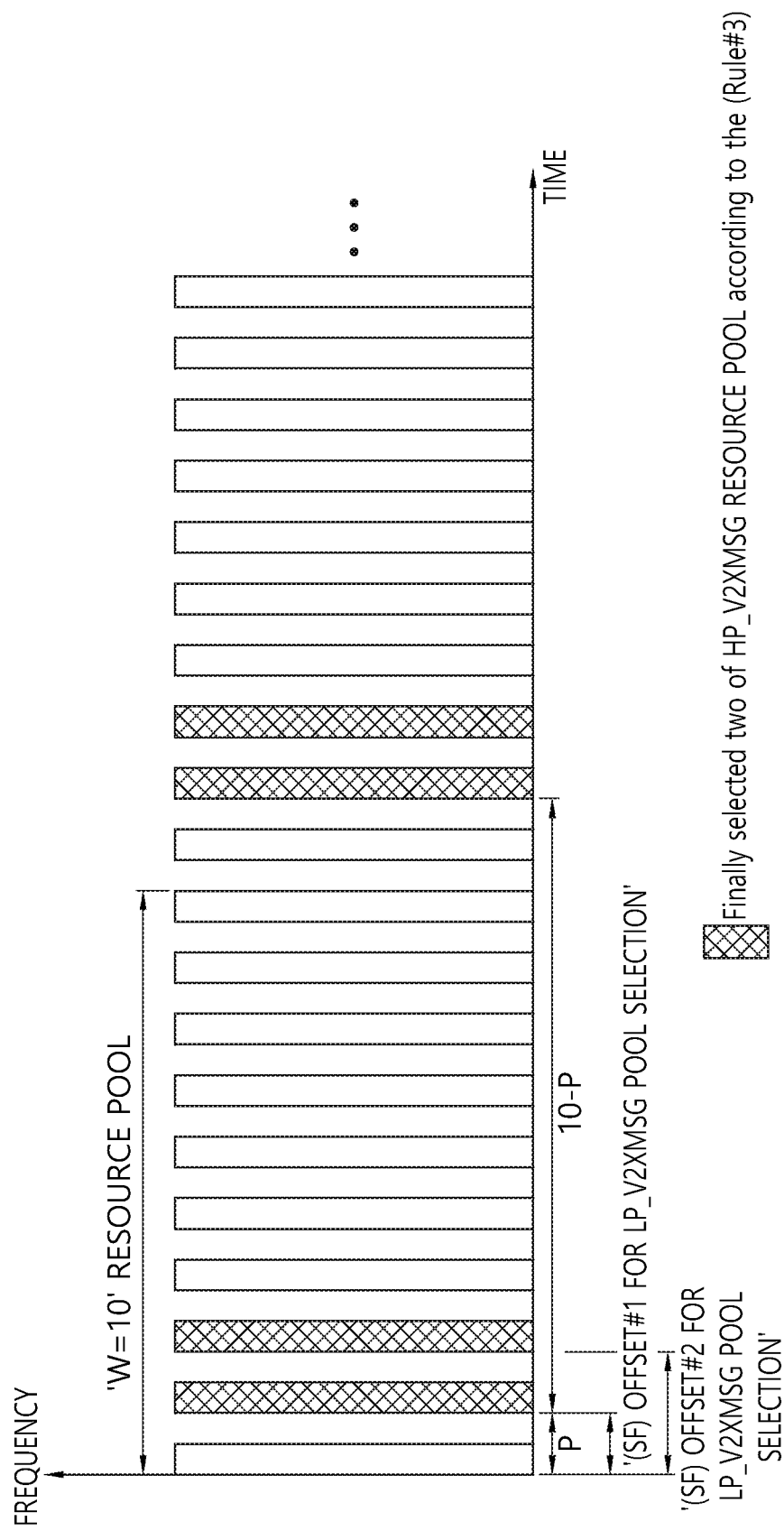
FIG. 19 shows an example of when the (Rule #3) is applied.

In this connection, in another example, it may be configured such that the V2X TX ENTITY divides the (existing) payload size of HP_V2XMSG into multiple sizes (for example, 2) according to the pre-defined ratio, and thereafter, the V2X TX ENTITY may perform transmission of the HP_V2XMSG having the divided payload size using each selected 'RESOURCE POOL' (for example, 'TX RESOURCE' selection may be performed randomly in the individual 'RESOURCE POOL'). FIG. 19 shows an example of when the (Rule #3) is applied.

In this connection, in one example, it may be assumed that the 'W' value is configured as '10'. Further, in one example, two (SF) OFFSETs ((SF) OFFSET #1, (SF) OFFSET #2) are assumed to be configured in this example.

The embodiments described above may be implemented in parallel or in combination. For example, the user device is assigned a (dedicated) resource pool that is used for V2X message transmissions with high priority, and the user device may transmit a corresponding (high priority) V2X message using a resource with relatively low energy as detected among the multiple resource regions in the resource pool configured to transmit V2X messages with a high priority.

4. A method in which the user device is assigned a (dedicated) resource pool that is used for V2X message transmissions with high priority, and the user device transmits a corresponding (high priority) V2X message using a resource with relatively low energy as detected among the multiple resource regions in the resource pool configured to transmit V2X messages with a high priority.

Figure 20:
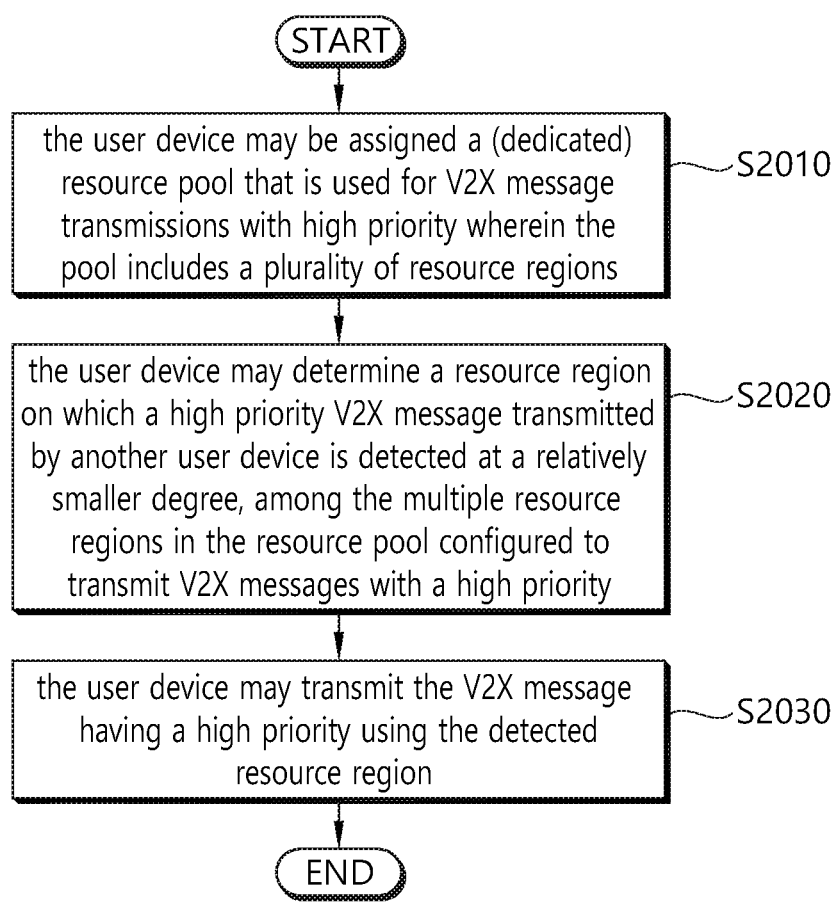
FIG. 20 is a sequence of methods for transmitting a V2X message having a high priority according to still yet another embodiment of the present invention.
Figure 21:
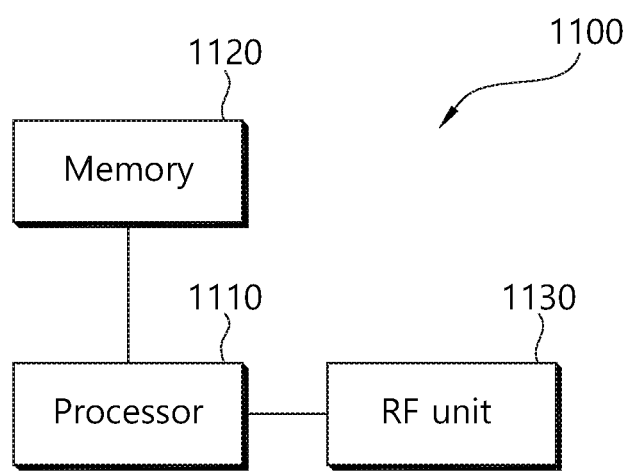
FIG. 21 is a block diagram illustrating the user device in which an embodiment of the present invention is implemented.

FIG. 20 is a sequence of methods for transmitting a V2X message having a high priority according to still yet another embodiment of the present invention.

Referring to FIG. 20, the user device may be assigned a (dedicated) resource pool that is used for V2X message transmissions with high priority wherein the pool includes a plurality of resource regions (S2010). A specific example in which the user device may be assigned a (dedicated) resource pool that is used for V2X message transmissions with high priority wherein the pool includes a plurality of resource regions is as described above.

Then, the user device may determine a resource region with relatively low energy as detected among the multiple resource regions in the resource pool configured to transmit V2X messages with a high priority, wherein the resource with relatively low energy as detected may refer to a resource on which a high priority V2X message transmitted by another user device is detected at a relatively smaller degree (S2020). In this connection, a specific example of detecting a resource with a relatively low energy as detected is as described above.

Thereafter, the user device may transmit the V2X message having a high priority using the detected resource (S2030). In this connection, the detailed example in which the user device transmits the V2X message is as described above.

It is obvious that examples of the proposed method described above may also be included as one of the implementation methods of the present invention, and thus may be regarded as a kind of proposed methods.

Further, the proposed schemes described above may be implemented independently, but may also be implemented as a combination (or merging) of some of the proposed schemes.

In the present invention, the proposed method is based on the 3GPP LTE system for the convenience of explanation, but the range of the system to which the proposed method is applied may be extended to another system in addition to the 3GPP LTE system.

In one example, the proposed methods of the present invention may be extended to D2D communication. In this connection, in one example, D2D communication means that the UE communicates directly with another UE using a wireless channel.

In this connection, the UE refers to the user device. The present disclosure may not be limited thereto. A network device such as the base station may also be regarded as a kind of UE when the network device such as the base station transmits/receives signals according to the communication protocols between UEs.

FIG. 22 is a block diagram illustrating the user device in which an embodiment of the present invention is implemented.

Referring to FIG. 22, the user device 1100 includes a processor 1110, a memory 1120, and a radio frequency unit 1130. The processor 1110 may be allocated a resource pool including a plurality of resource regions as configured to transmit a V2X message having a high priority. The processor 1110 may detect a resource with a relatively low energy as detected among a plurality of resource regions on the resource pool configured to transmit the V2X message having the high priority. The processor 1111 may transmit the V2X message having a high priority using the detected resource.

The RF unit 1130 is connected to the processor 1110 to transmit and receive radio signals.

The processor may comprise an application-specific integrated circuit (ASIC), other chipset, logic circuitry and/or a data processing device. The memory may include read-only memory (ROM), random access memory (RAM), flash memory, memory card, storage media and/or other storage devices. The RF unit may include a baseband circuit for processing the radio signal. When the embodiment is implemented in software, the above-described techniques may be implemented with modules (processes, functions, etc.) that perform the functions described above. The module may be stored in memory and executed by the processor. The memory may be internal or external to the processor, and may be coupled to the processor by any of a variety of well known means.

What is claimed is:

1. A method for transmitting a vehicle-to-X (V2X) message in a wireless communication system, the method performed by a user equipment (UE), and comprising:
allocating a high priority resource pool configured to be used to transmit a V2X message having a high priority,
wherein the high priority resource pool includes a plurality of resource regions, and
wherein, in the high priority resource pool, only a transmission of the V2X message having the high priority is performed;
configuring the plurality of resource regions in the high priority resource pool such that the V2X message having the high priority is transmitted on a first resource region that is different from a second resource region that is used by another UE to transmit a high-priority V2X message; and
transmitting the V2X message having the high priority via the first resource region,
wherein the high priority resource pool is configured to have a first period, and a low priority resource pool is configured to have a second period,
wherein the first period is longer than the second period,
wherein the high priority resource pool is repeated based on the first period and the low priority resource pool is repeated based on the second period,
wherein the low priority resource pool is a resource pool used for transmitting a V2X message having a low priority,
wherein the high priority resource pool is a resource pool which comprises a larger amount of resources rather than the low priority resource pool on a frequency domain and a time domain,
wherein the V2X message having the high priority is a security message having a longer period rather than another V2X message having a low priority,
wherein the UE transmits the V2X message having the high priority to a pedestrian UE,
wherein the pedestrian UE is a UE possessed by a pedestrian,
wherein the high priority resource pool is a common resource pool between the UE and the pedestrian UE, and
wherein the high priority resource pool is an only resource pool capable of receiving the V2X message having the high priority by the pedestrian UE.

2. The method of claim 1, wherein the allocating comprises allocating the high priority resource pool based on a pre-configured offset value among a plurality of resource pools assigned to the UE.

3. The method of claim 1, wherein the V2X message having the higher priority is a V2X message having a larger payload size than a V2X message having a priority lower than the higher priority.

4. The method of claim 1, wherein the V2X message having the high priority is a V2X message about a certificate.

5. The method of claim 1, wherein the high priority resource pool is a resource pool on which the pedestrian UE wakes up only.

6. The method of claim 1, wherein the another V2X message having a low priority is a message other than the security message.

7. A user equipment (UE) for transmitting a vehicle-to-X (V2X) message comprising:
a transceiver configured for transmitting and receiving a radio signal; and
a processor coupled to the transceiver and configured to:
allocate a high priority resource pool configured to be used to transmit a V2X message having a high priority, wherein the high priority resource pool includes a plurality of resource regions, and wherein, in the high priority resource pool, only a transmission of the V2X message having the high priority is performed;

configure the plurality of resource regions in the high priority resource pool such that the V2X message having the high priority is transmitted on a first resource region that is different from a second resource region that is used by another UE to transmit a high-priority V2X message; and control the transceiver to transmit the V2X message having the high priority via the first resource region, wherein the high priority resource pool is configured to have a first period, and a low priority resource pool is configured to have a second period, wherein the first period is longer than the second period, wherein the high priority resource pool is repeated based on the first period and the low priority resource pool is repeated based on the second period, wherein the low priority resource pool is a resource pool used for transmitting a V2X message having a low priority, wherein the high priority resource pool is a resource pool which comprises a larger amount of resources rather than the low priority resource pool on a frequency domain and a time domain, wherein the V2X message having the high priority is a security message having a longer period rather than another V2X message having a low priority, wherein the UE transmits the V2X message having the high priority to a pedestrian UE, wherein the pedestrian UE is a UE possessed by a pedestrian, wherein the high priority resource pool is a common resource pool between the UE and the pedestrian UE, and wherein the high priority resource pool is an only resource pool capable of receiving the V2X message having the high priority by the pedestrian UE.

* * * * *